United States Patent
Levi et al.

(10) Patent No.: US 8,452,646 B2
(45) Date of Patent: *May 28, 2013

(54) SYSTEM AND METHOD FOR PROVIDING ENDORSED ELECTRONIC OFFERS BETWEEN COMMUNICATION DEVICES

(75) Inventors: Andrew E. Levi, Plano, TX (US); Bradley W. Bauer, Richardson, TX (US)

(73) Assignee: Blue Calypso, LLC, Dallas, TX (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/925,218

(22) Filed: Oct. 14, 2010

(65) Prior Publication Data

US 2012/0095840 A1   Apr. 19, 2012

(51) Int. Cl.
*G06Q 30/00*   (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | | |
|---|---|---|---|
| 4,850,007 A | 7/1989 | Marino et al. | |
| 5,333,186 A | 7/1994 | Gupta | |
| 5,448,625 A | 9/1995 | Lederman | |
| 5,852,775 A | 12/1998 | Hidary | |
| 5,937,037 A | 8/1999 | Kamel et al. | |
| 6,009,150 A | 12/1999 | Kamel | |
| 6,084,628 A | 7/2000 | Sawyer | |
| 6,181,927 B1 | 1/2001 | Welling, Jr. et al. | |
| 6,324,519 B1 | 11/2001 | Eldering | |
| 6,442,529 B1 | 8/2002 | Krishan et al. | |
| 6,493,437 B1 | 12/2002 | Olshansky | |
| 6,647,257 B2 | 11/2003 | Owensby | |
| 7,184,972 B2 | 2/2007 | Flaherty | |
| 7,197,544 B2 | 3/2007 | Wang et al. | |
| 7,240,843 B2 | 7/2007 | Paul | |
| 7,389,118 B2 | 6/2008 | Vesikivi et al. | |
| 7,599,852 B2 | 10/2009 | Bosarge et al. | |
| 2001/0047294 A1 | 11/2001 | Rothschild | |
| 2002/0071076 A1 | 6/2002 | Webb | |
| 2002/0072967 A1 | 6/2002 | Jacobs et al. | |
| 2002/0077988 A1 | 6/2002 | Sasaki et al. | |
| 2002/0091569 A1 | 7/2002 | Kitaura | |

(Continued)

FOREIGN PATENT DOCUMENTS

| | | |
|---|---|---|
| JP | 2001/256388 A | 9/2001 |
| JP | 2007/219840 A | 8/2007 |

(Continued)

OTHER PUBLICATIONS

Gao, J Kulkarni, V Ranavat, H Lee Chang Hsing Mei; A 2D Barcode-Based Mobile Payment System; Multimedia and Ubiquitous Engineering, 2009. MUE '09; Jun. 4-6, 2009; pp. 320-329.

(Continued)

*Primary Examiner* — Saba Dagnew

(74) *Attorney, Agent, or Firm* — Schultz & Associates, P.C.

(57) ABSTRACT

A system and method are disclosed for distribution of advertisements and electronic offers between communication devices. The system and method provides for accounting and distribution of incentives related to distribution of the advertisements and offers. A bi-directional selection between subscribers and advertisers using the system is created whereby both advertisers and subscribers agree to participate in the distribution of advertisements and offers. The system further provides for a means of redeeming offers utilizing points of sale and analytics associated to the redemption of electronic offers.

13 Claims, 13 Drawing Sheets

Automatic Subscriber Enrollment Process

U.S. PATENT DOCUMENTS

| | | |
|---|---|---|
| 2002/0094868 A1 | 7/2002 | Tuck et al. |
| 2002/0160761 A1 | 10/2002 | Wolfe |
| 2002/0198777 A1 | 12/2002 | Yuasa |
| 2003/0032409 A1 | 2/2003 | Hutcheson et al. |
| 2003/0144035 A1 | 7/2003 | Weinblatt |
| 2003/0158776 A1 | 8/2003 | Landesmann |
| 2003/0172376 A1 | 9/2003 | Coffin, III |
| 2003/0177347 A1 | 9/2003 | Schneier |
| 2003/0233276 A1 | 12/2003 | Pearlman |
| 2004/0103023 A1 | 5/2004 | Irwin |
| 2004/0148424 A1 | 7/2004 | Berkson et al. |
| 2004/0177003 A1 | 9/2004 | Liao |
| 2005/0044483 A1 | 2/2005 | Maze et al. |
| 2005/0055409 A1 | 3/2005 | Alsarraf et al. |
| 2006/0041469 A1 | 2/2006 | Mathis |
| 2006/0041477 A1 | 2/2006 | Zheng |
| 2006/0080111 A1 | 4/2006 | Homeier Beals |
| 2006/0111967 A1 | 5/2006 | Forbes |
| 2007/0016921 A1 | 1/2007 | Levi et al. |
| 2007/0192182 A1 | 8/2007 | Monaco |
| 2007/0203792 A1 | 8/2007 | Rao |
| 2007/0241189 A1 | 10/2007 | Slavin |
| 2007/0244750 A1 | 10/2007 | Grannan et al. |
| 2007/0271139 A1 | 11/2007 | Fiorini |
| 2007/0281692 A1 | 12/2007 | Bucher |
| 2007/0290031 A1 | 12/2007 | Singh |
| 2008/0133366 A1 | 6/2008 | Evans |
| 2008/0133678 A1 | 6/2008 | Woodham et al. |
| 2008/0172285 A1 | 7/2008 | Hurowitz |
| 2008/0183587 A1 | 7/2008 | Joo et al. |
| 2008/0263584 A1 | 10/2008 | Salo et al. |
| 2008/0287150 A1 | 11/2008 | Jiang et al. |
| 2009/0030774 A1 | 1/2009 | Rothschild et al. |
| 2009/0099929 A1 | 4/2009 | Thibedeau |
| 2009/0106368 A1 | 4/2009 | Padveen et al. |
| 2009/0204901 A1 | 8/2009 | Dharmaji et al. |
| 2009/0287574 A1 | 11/2009 | Kane |

FOREIGN PATENT DOCUMENTS

| | | |
|---|---|---|
| KR | 2006/028602 A | 3/2006 |
| WO | WO 96/24213 A1 | 8/1996 |
| WO | WO00/41121 A1 | 7/2000 |
| WO | 2001/011472 | 2/2001 |
| WO | WO01/16853 A1 | 3/2001 |
| WO | WO2007/139348 A1 | 12/2007 |
| WO | WO 2009/148338 A2 | 12/2009 |

OTHER PUBLICATIONS

Aigner, Manfred Dominikus, Sandra Feldhofer, Martin; A System of Secure Virtual Coupons Using NFC Technology; PerCom Workshops '07. Mar. 19-23, 2007; pp. 362-366.

Gao, Jagatesan; Understanding 2D-BarCode Tech and Appls in M-Commerce-Design and Implementation of a 2D Barcode Processing Solution; COMPSAC 2007; Jul. 24-27, 2007; pp. 49-56.

Kato, H. Tan, K.T.; 2D barcodes for mobile phones; Mobile Technology, Applications and Systems, 2005 2nd International Conference on; Nov. 15-17, 2005; p. 8.

Koung-Lung Lin Hsu, J.Y.-J. Han-Shen Huang Chun-Nan Hsu; A recommender for targeted advertisement of unsought products in e-commerce; CEC 2005; Jul. 19-22, 2005; pp. 101-108.

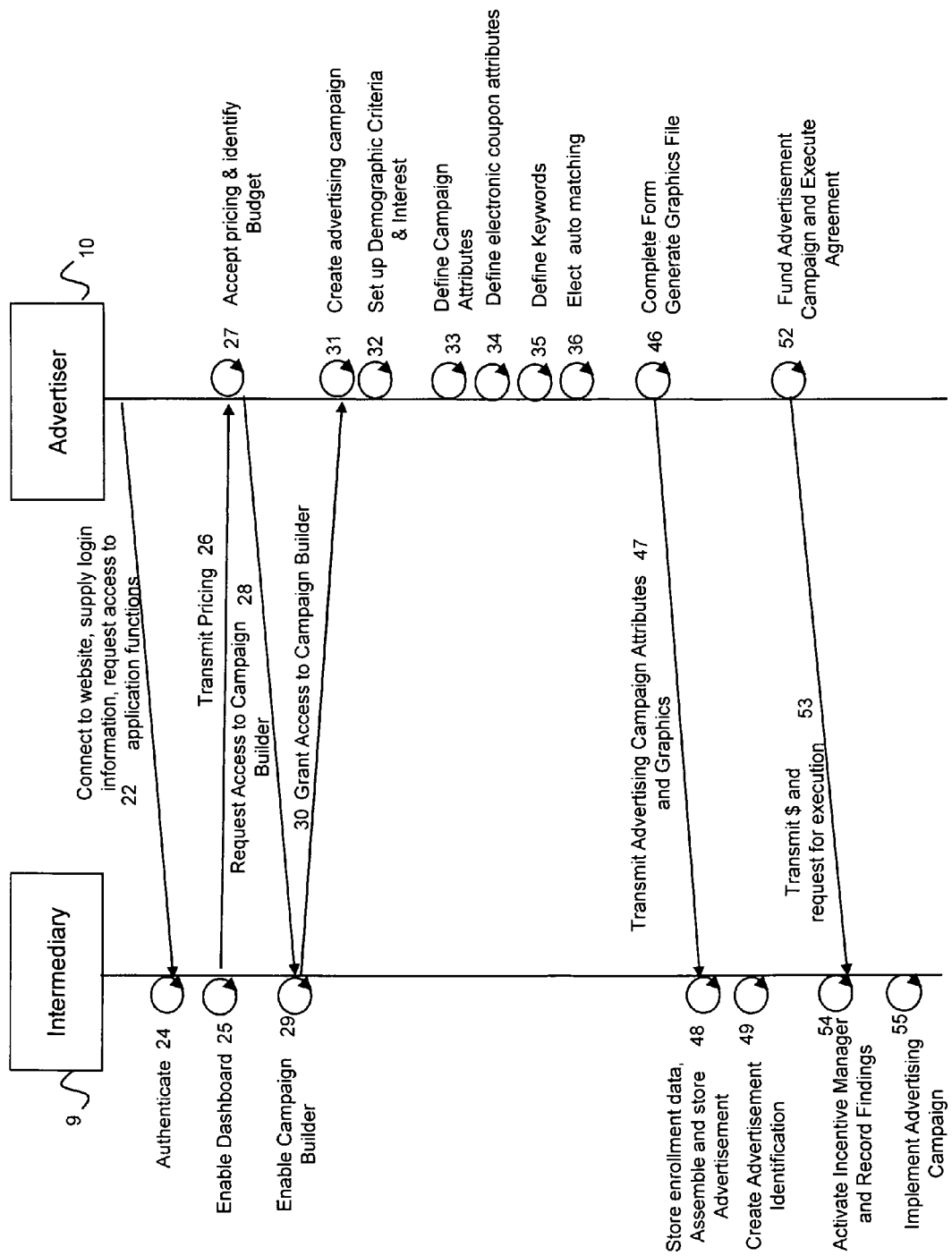
Figure 3  Advertiser Enrollment Process

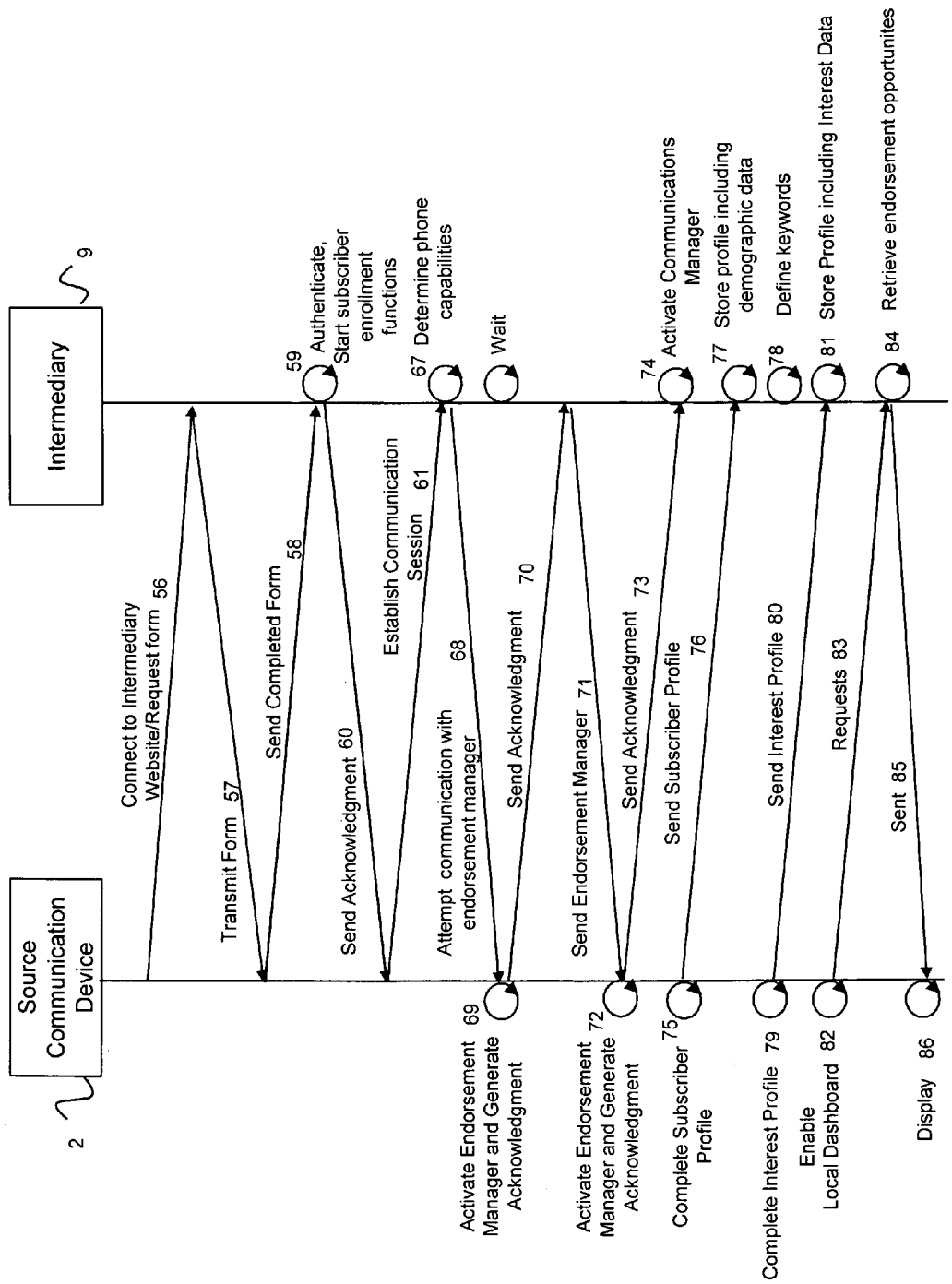
Figure 4  Subscriber Sign Up Process

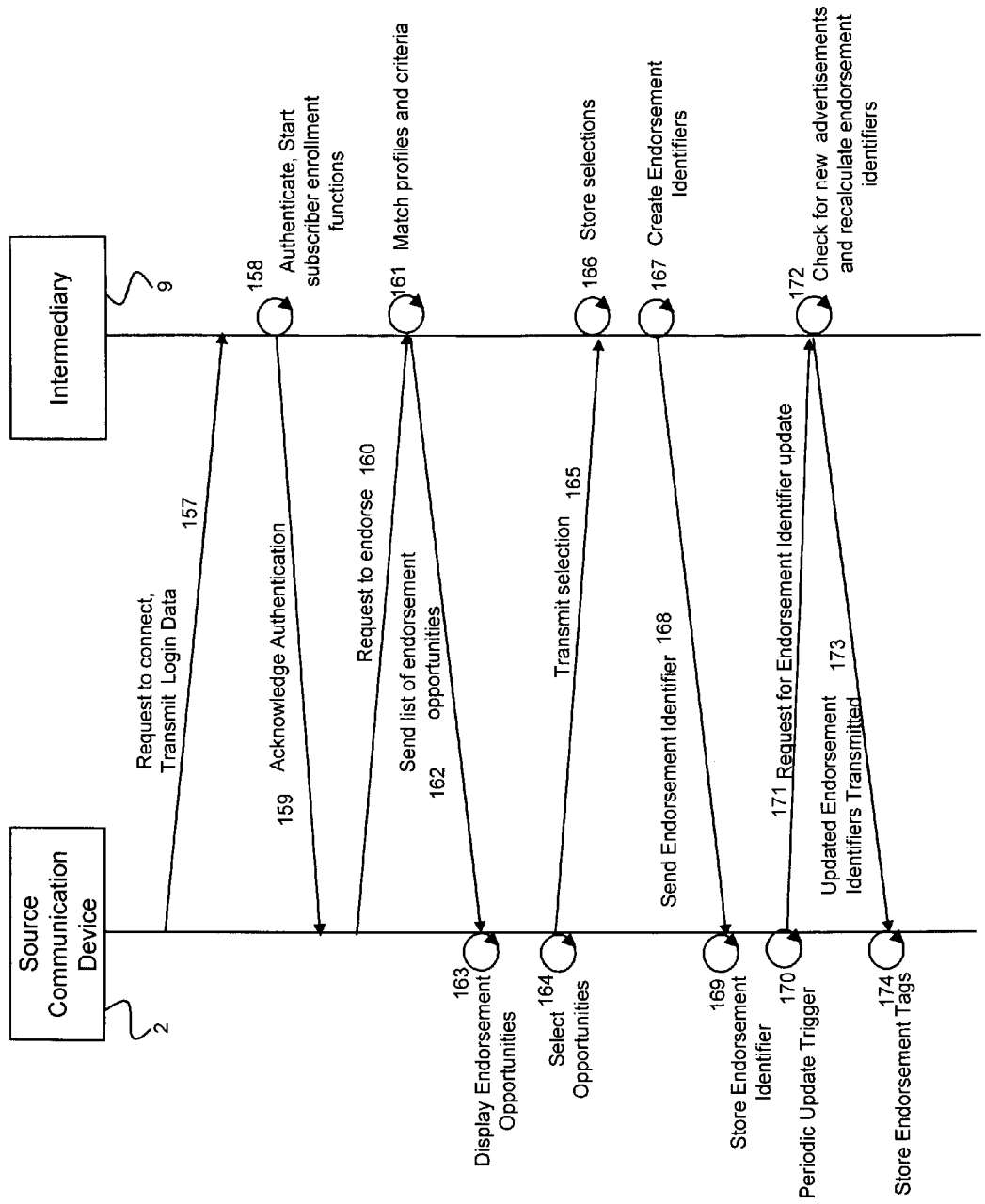
Figure 5A  Manual Subscriber Enrollment Process

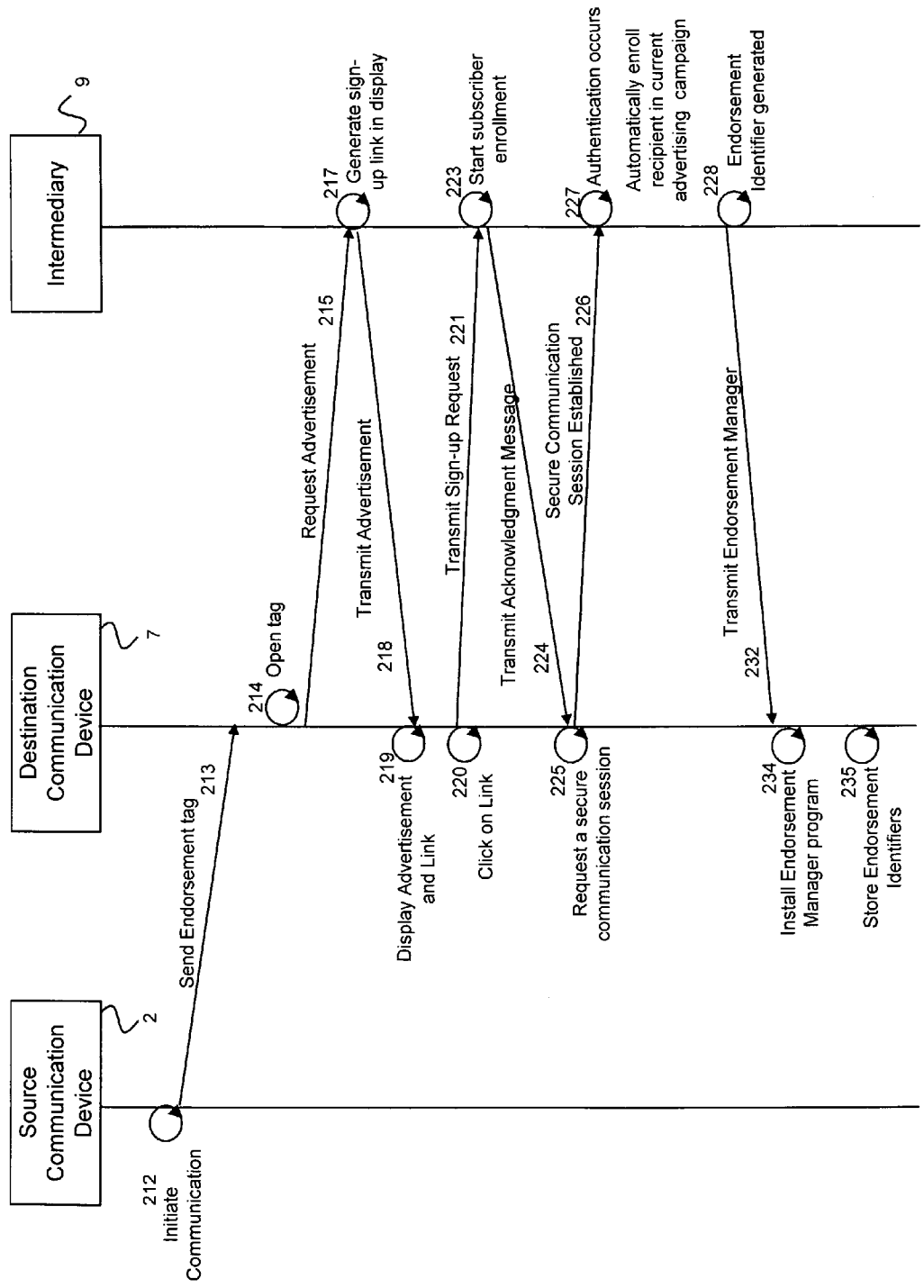
Figure 5B  Automatic Subscriber Enrollment Process

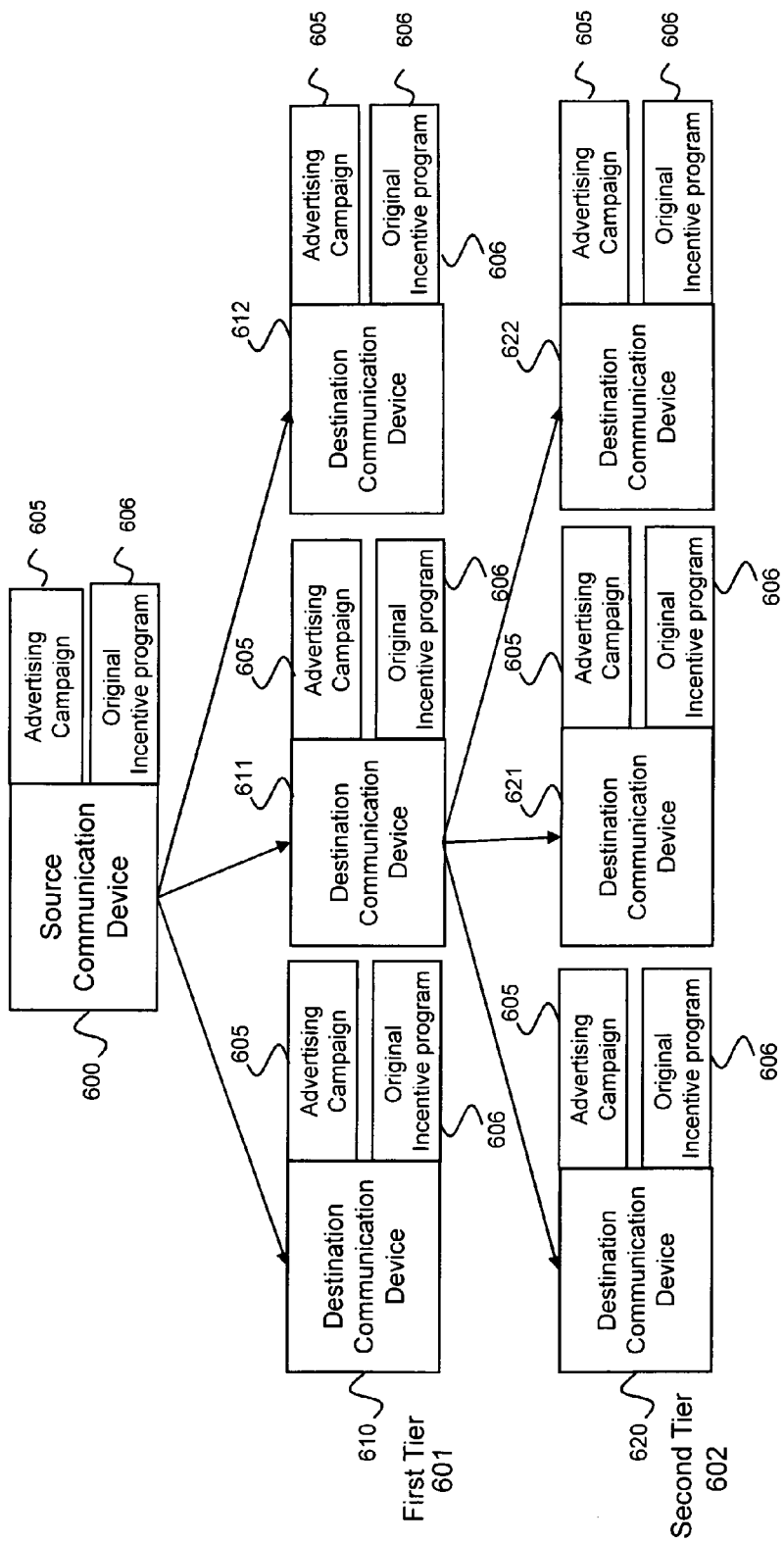
Figure 5C  Automatic Multi-Tier Subscriber Enrollment Process

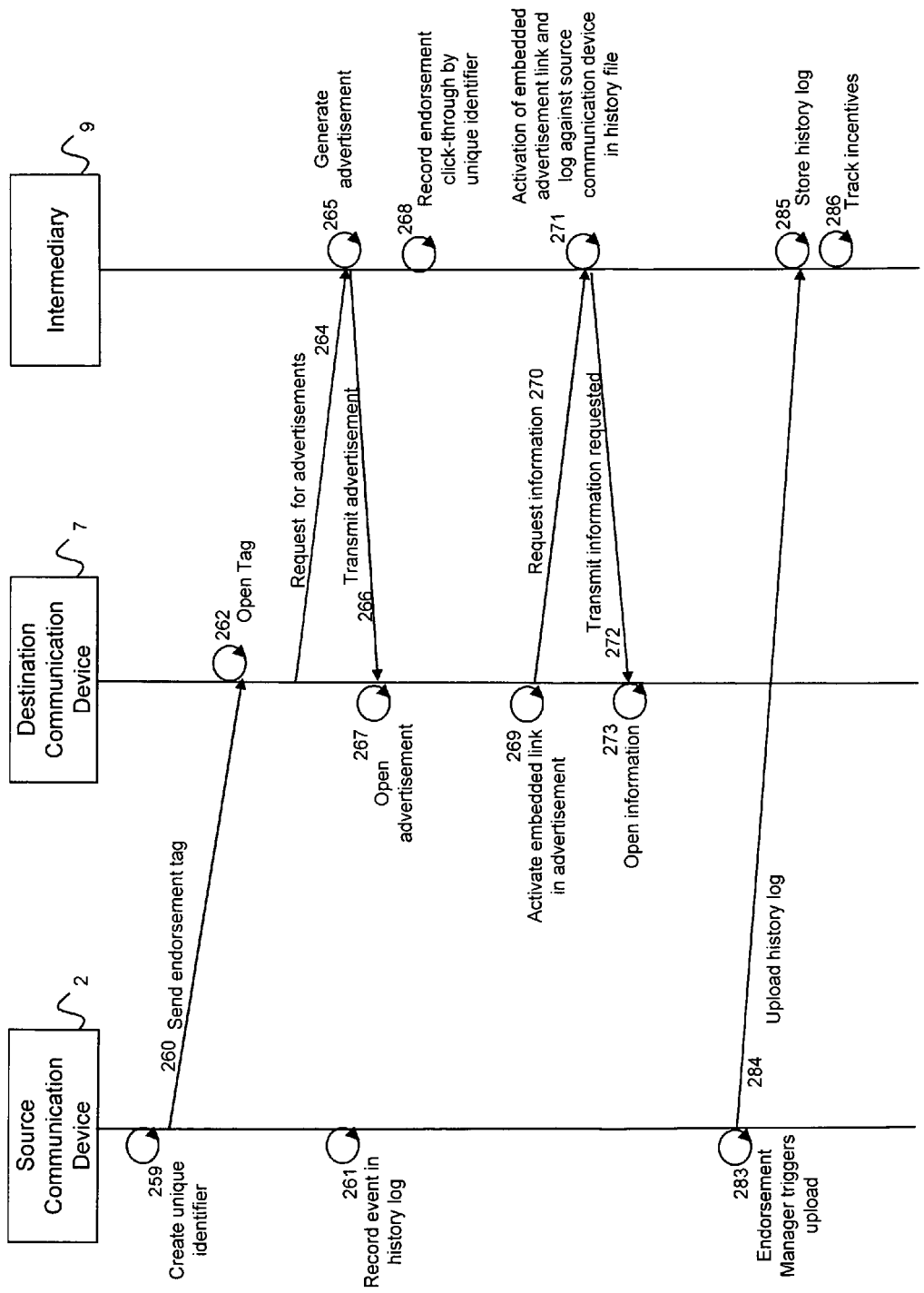
Figure 6    Advertisement Distribution Process

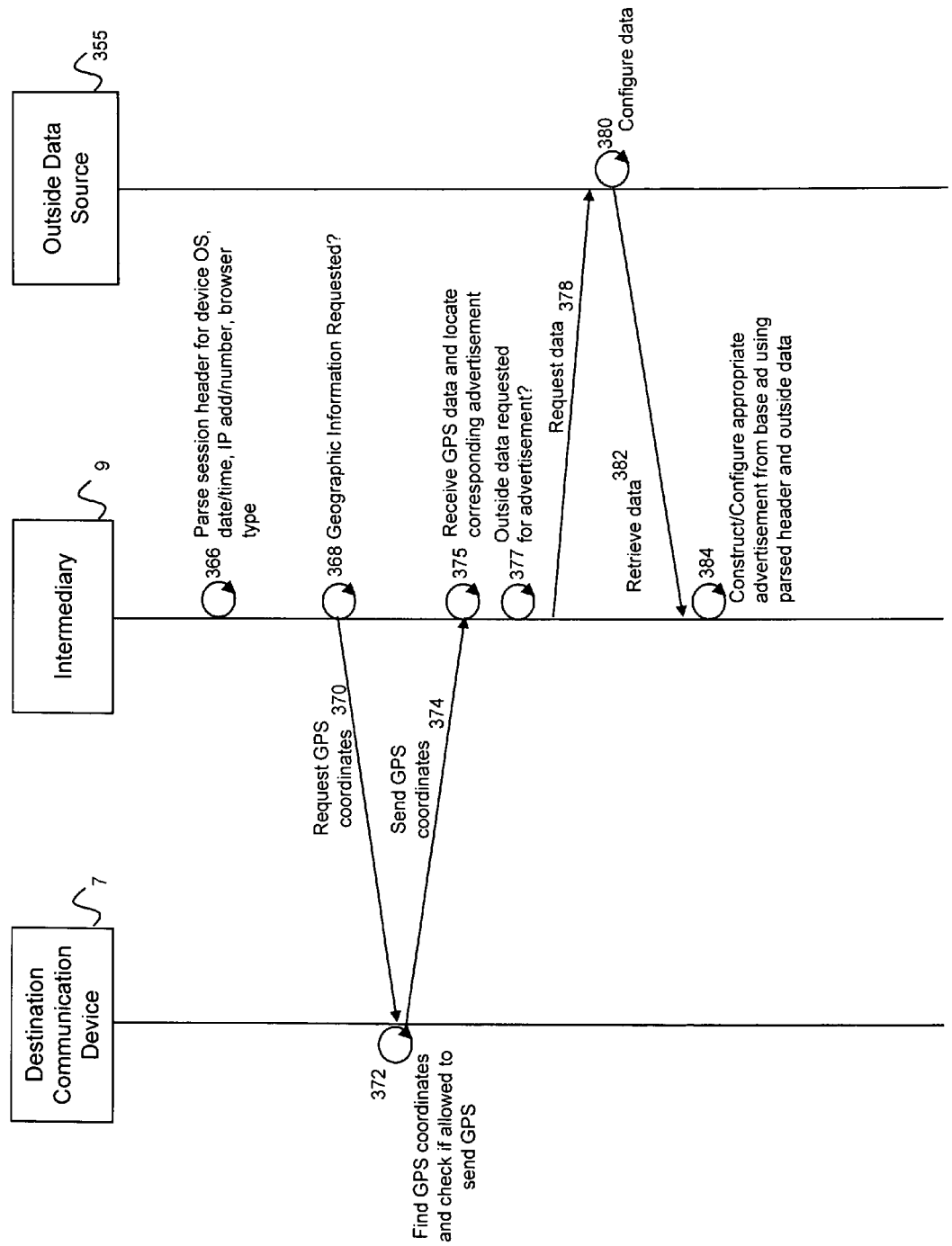
Figure 7   Dynamic Content Advertisement Generation Process

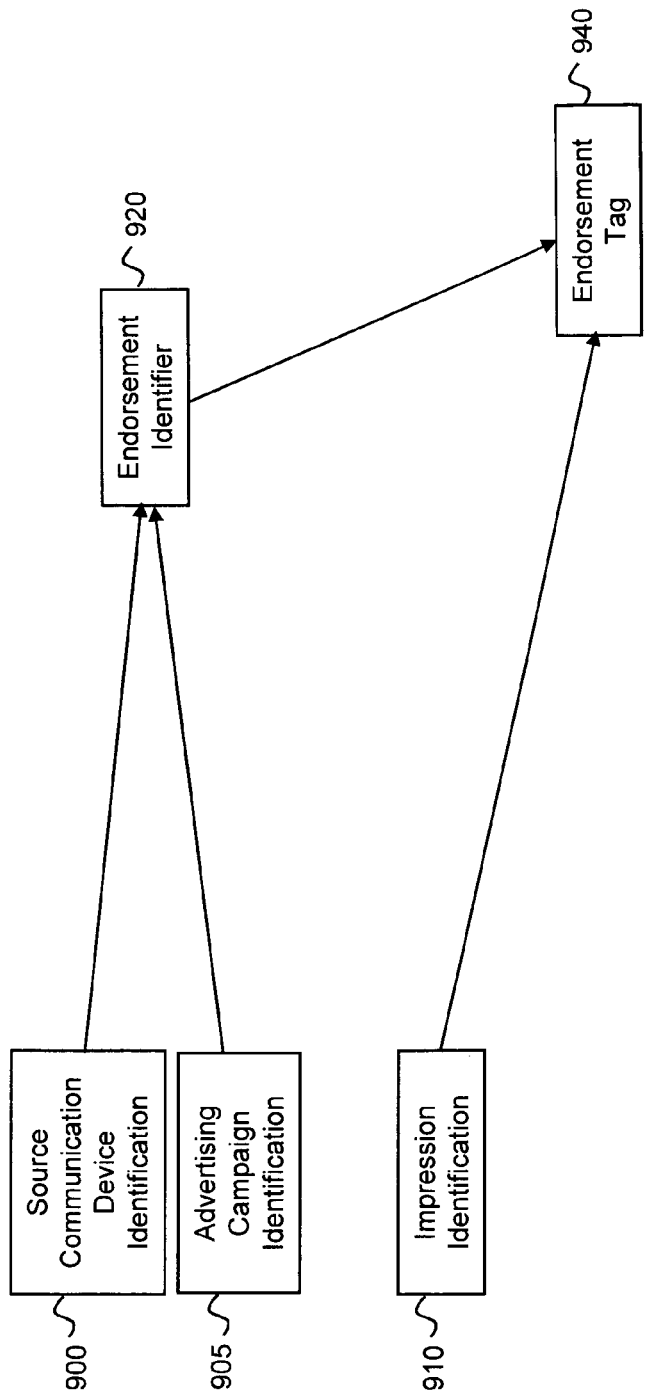
Figure 8    Creation of Unique Identifier

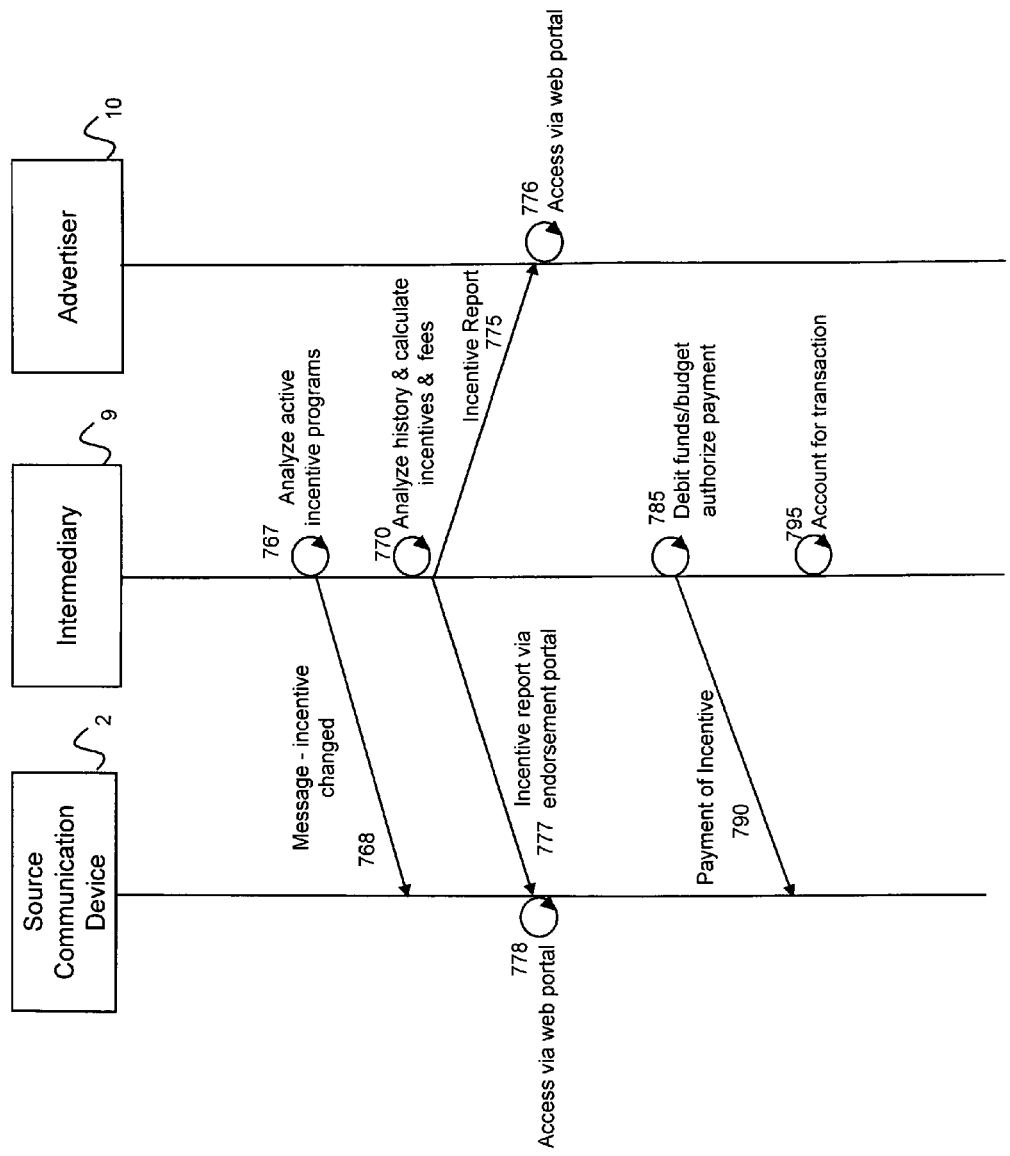
Figure 9  Incentive Administration Process

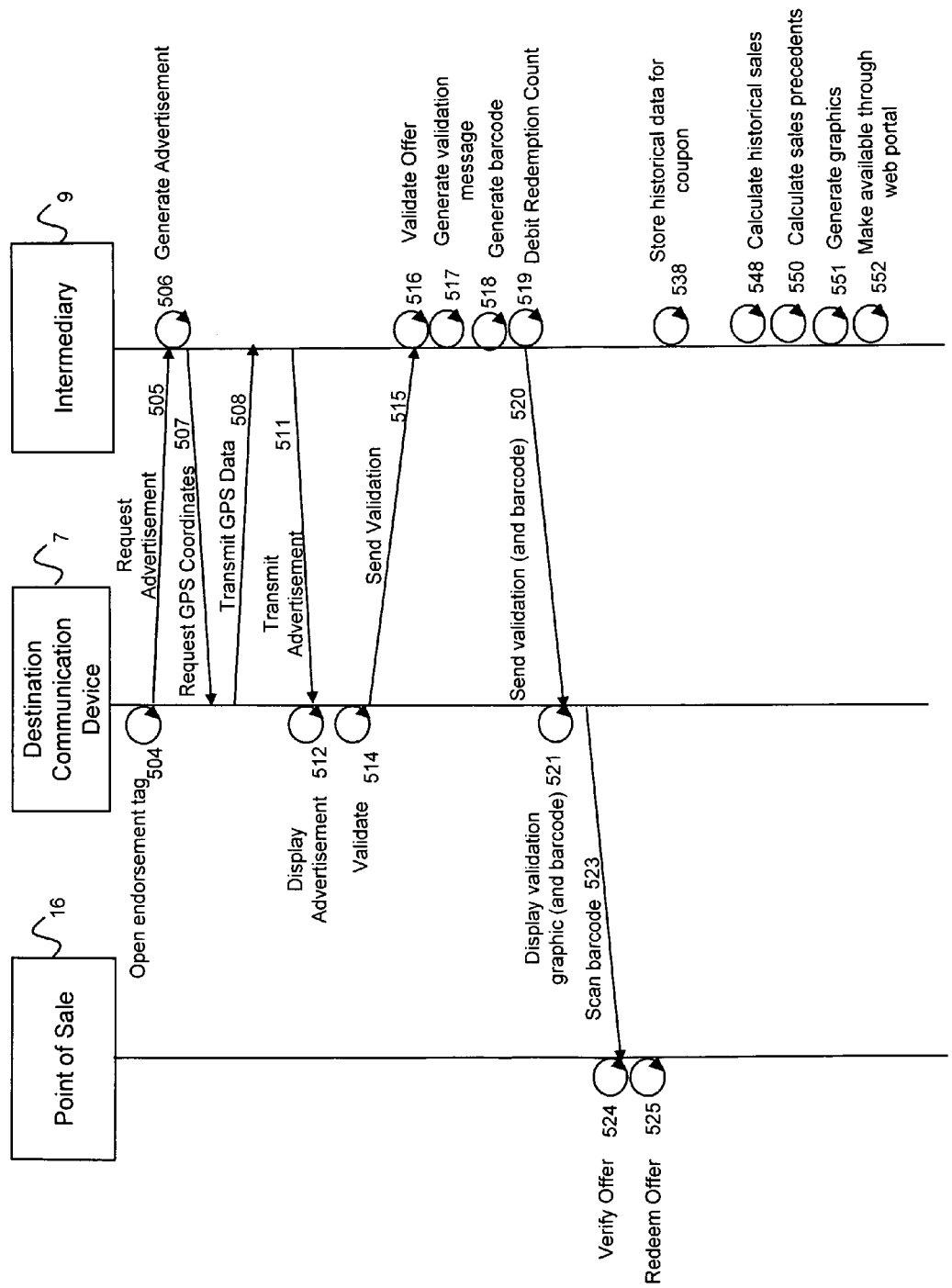
Figure 10  Electronic Offer Redemption Process

SYSTEM AND METHOD FOR PROVIDING ENDORSED ELECTRONIC OFFERS BETWEEN COMMUNICATION DEVICES

CROSS-REFERENCE TO RELATED APPLICATIONS

This application claims priority from U.S. Pat. No. 7,664,516 filed on Dec. 23, 2005, U.S. Provisional Patent Application No. 60/639,267 filed Dec. 27, 2004; U.S. patent application Ser. No. 12/592,019 filed Nov. 18, 2009; and U.S. patent application Ser. No. 12/803,635 filed Jul. 1, 2010. The disclosure in U.S. Pat. No. 7,664,516 and U.S. patent application Ser. Nos. 12/592,019 and 12/803,635 are incorporated herein by reference.

BACKGROUND

It is well known that traditional advertising media such as newspapers, public radio and television has suffered a dramatic decrease in popularity and advertising effectiveness with the advent of the internet and mobile phone technology. Advertisers, therefore, are highly motivated to identify new methods of distributing advertisements in order to create effective brand awareness. As newer technologies such as mobile phones evolve into highly sophisticated two-way communication systems, such technologies can be leveraged to provide trackable advertising impressions and brand awareness by directly displaying advertisements and testimonials to potential customers.

Today, consumers can control which advertisements reach them more effectively than in the past. For example, newer technologies like digital video recorders (DVRs) allow users to skip undesirable advertisements. Similarly satellite radio allows users to listen to music without commercials.

With the declining ability to offer advertisements through traditional broadcast advertising media, this invention provides an advertising system that offers frequent and effective advertising to targeted audiences.

This invention also provides a system in which recipients view personally endorsed advertisements by known contacts to increase the acceptance of the advertisement and to link to personalized testimonials of the advertisement for distribution to the existing personal contacts.

This invention provides the ability to generate, transmit, validate and track usage of electronic offers and award subsidies and value to subscribers and recipients.

Other advantages and aspects of the invention will become apparent upon reading the following disclosure.

SUMMARY

The system disclosed provides for transmission of an endorsement tag between a source communication device and a destination communication device over a network. The endorsement tag includes a serialized URL link that when activated causes an advertisement to be sent from a third party intermediary to the destination communication device over the network. The intermediary functions to, among other things, identify which advertisement to send by virtue of decoding the serialized URL link and associating that link with a stored advertising content.

The system provides for a "bi-directional" acceptance process between a subscriber and an advertiser. The bi-directional selection process allows subscribers to choose or "endorse" certain advertisers and advertising campaigns with which they wish to associate. The bi-directional selection process also allows advertisers to choose which subscribers to approve by virtue of a review of related demographic, psychographic or interest information of each subscriber and pre-qualification of acceptable candidates.

The advertiser determines if the subscriber is pre-qualified based on a correlation between the subscriber's demographics and those desired by the advertiser. Pre-qualification of one subscriber allows the advertiser to target advertisements to a related group of potential customers because the qualified subscriber's contacts presumably share some or all of the same attributes and/or interests. Therefore, the contacts of the subscriber provide broad potential market to the advertiser, while requiring only a single demographic comparison to the subscriber. This allows an advertiser to focus its advertisements on favorable target markets without having to examine the attributes and interests of a large number of potentially unqualified prospects.

The system disclosed enables advertisers to reach targeted audiences by contact with mobile communications devices. Mobile communication devices encourage the recipient of a communication to accept advertisements because the session is identified as being initiated by a known contact. Only after acceptance by the recipient is the advertisement and associated testimonial displayed. Subscribers and recipients are provided incentives to participate. Cash incentives are provided on debit cards or other distribution methods.

In another embodiment, tools for social networking, including tools for the creation and display of testimonials, are combined with the incentive programs. These tools encourage recipient comments and follow-up testimonial messages. The embodiment provides for the storage, retrieval and display of the follow-up testimonial messages in connection with an advertisement.

In another embodiment, a hierarchical network of subscribers results from an initial communication. Each subscriber in the hierarchical network inherits features from the original subscriber including features of the original subscriber's profile. The inheritance accelerates the building of qualified subscribers and a broad advertising audience.

Provisions are made for incentive administration and reporting such as collecting regular advertising impression data, periodic processing of the incentive plans and continued updating of advertising campaigns and incentive programs.

It is in the interest of subscribers and advertisers jointly to participate in use of the system. For advertisers, click-throughs promote targeted brand awareness which generate demand for products. For subscribers, click-throughs promote incentive payments and perpetuate brand loyalty. Also, there is a recognition of the value of social media networking in relation to raising brand recognition through targeted testimonials related to advertisements.

In another embodiment, a system and method is disclosed for providing, validating and verifying electronic offers. The electronic offers are sent to a mobile device for use at participating point of sale. A time limitation for offer redemption may be included. Similarly, a set of redemptive limits may be set allowing simple or repeated use of the electric offer. The electronic offers and attributes related thereto may be tracked by an analytics function for historical and predictive trend analysis and for geographical mapping.

DEFINITIONS

"Advertisement": a text, picture, video, audio media or offer provided by an advertiser and associated with an endorsement tag.

"Advertiser": an entity providing an advertisement.

"Advertising Campaign": a collection of related advertisements and incentives.

"Advertising Endorsement System": a system for providing advertisements and endorsements between communication devices.

"Benefit": a discount on a service or product, a cash incentive or a product or service awarded for use of an offer.

"Computer-readable Medium": any apparatus that can contain, store, communicate, propagate, and transport a computer program for use in connection with the advertising system.

"Offer": an actionable display on a subscriber communication device or a destination communication device that when validated provides a benefit.

"Destination Communication Device": a computer, cell phone, smart phone or other device capable of receiving a communication message.

"Endorsement": an event of sending an endorsement tag to a recipient.

"Endorsement Tag": an active link including a unique identifier to allow viewing and tracking of advertisements, source communication devices and event identifications.

"Endorsement Identifier": a unique identification or code composed of a combination of a source communication device identifier and advertising campaign identification.

"Endorser": a subscriber who has selected an advertiser to endorse.

"Incentive": a reward provided to a subscriber based on an endorsement.

"Incentive Program": a set of rules governing an incentive distribution.

"Interest Criteria": Demographic and psychographic information and other information related to interests or keywords, "Intermediary": one or more computer servers and memory executing computer applications and communications to implement the advertising endorsement system.

"Qualified Subscriber": a person who meets the demographic criteria of an advertiser.

"Recipient": a person in possession of a destination communication device.

"Source Communication Device": a computer, cell phone, smart phone or other device capable of sending a communication message and an endorsement tag.

"Subscriber": a person in possession of a source communication device, who has created a profile on the intermediary system.

"Testimonial": a text message, picture, audio or video message associated with an advertisement.

It should be understood that the terms advertisement, advertiser, advertising, benefit, campaign, destination communication device, endorsement, endorsement tag, endorser, incentive, incentive program, intermediary, qualified subscriber, recipient, source communication device, subscriber, and offer, while referred to in the singular shall mean their plural forms as well.

BRIEF DESCRIPTION OF THE DRAWINGS

The following disclosure is understood best in association with the accompanying figures. Like components share like numbers.

FIG. 3 a flowchart of an embodiment of the advertiser enrollment process.

FIG. 4 is a flowchart of an embodiment of a subscriber sign-up process.

FIG. 5A is a flowchart of an embodiment of a manual subscriber enrollment process.

FIG. 5B is a flowchart of am alternate embodiment of an automatic subscriber enrollment process.

FIG. 5C is a flowchart of an embodiment including an automatic multi-tier subscriber enrollment process.

FIG. 6 is a flowchart showing an advertisement distribution process.

FIG. 7 is a flowchart showing a method of creating dynamic advertisements.

FIG. 8 describes a method for the creation of a unique identifier.

FIG. 9 is a flowchart showing an incentive administration process.

FIG. 10 is a flowchart showing an electronic offer redemption process.

DETAILED DESCRIPTION

Figure 1:
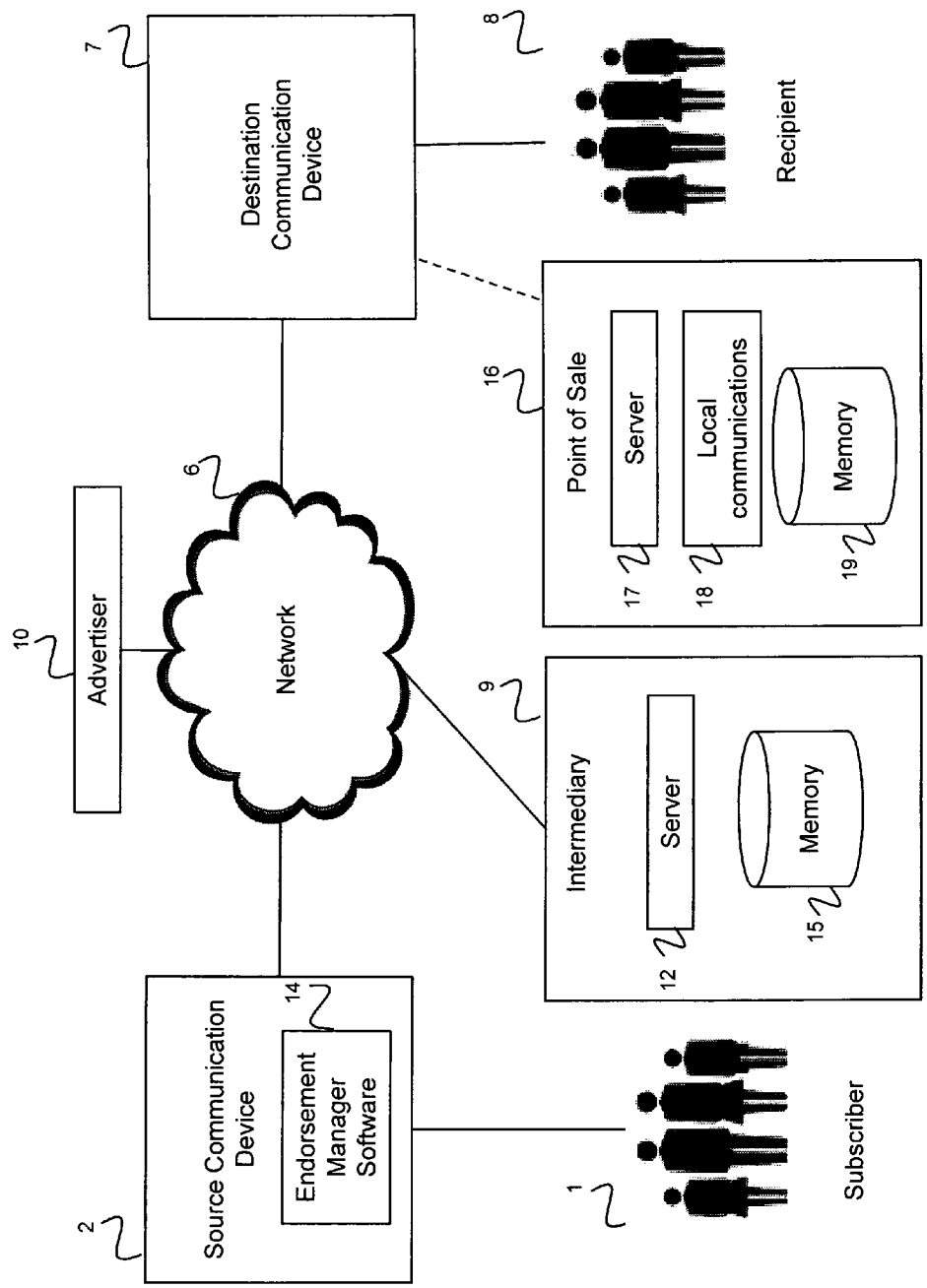
FIG. 1 is a diagram of exemplary components of an advertising endorsement system.

FIG. 1 is a diagram of exemplary components of an advertising endorsement system for providing direct advertising between communication devices. Subscriber 1, in possession of a source communication device 2, subscribes to an advertisement incentive program managed by an intermediary 9 to distribute advertisements from advertiser 10 to destination communication device 7 in possession of recipient 8.

Intermediary 9 includes a server 12, running a group of application programs and communicating with memory 15.

Source communication device 2 is in communication with destination communication device 7 via network 6. Examples of network 6 may be the Internet, a private network, a cellular phone network, or other service provider networks. The source communication device and the destination communication device preferably support digital communications and recording of electronic files such as audio, pictures, text and video. Preferred communication devices include cellular phones, smart phones, internet phones, WIFI devices, personal computers, personal digital assistants and instant messaging devices.

Operating systems running on source communication device 2 and destination communication device 7 coordinate and provide control of various components. Object-oriented software systems are preferred. The software systems run in conjunction with the operating system and provide calls to the operating system programs or applications executing on the source communication device 2 and destination communication device 7.

Source communication device 2 communicates with destination communication device 7 using a communications protocol. Examples of the communication protocol include Transmission Control Protocol/Internet Protocol (TCP/IP); Global System for Mobile Communications (GSM) including Short Messaging Service (SMS), multimedia messaging service (MMS), Code Division Multiple Access (CDMA), Wireless Application Protocol (WAP), 3G and 4G communication services including SMS, MMS protocols and WIFI.

Advertiser 10 includes a communication device capable of communicating with intermediary 9 over network 6. Examples include servers and personal computers connected to the network.

Point of sale 16 includes a computer 17, a local communications device 18, a memory 19 and a second communications device. Examples of a local communications device include a barcode scanner and a local wireless network interface.

In use, the system is activated by the advertiser initiating an advertising program. To initiate an advertising program, the advertiser is required to complete a setup process, provide a set of demographic and interest criteria and build and upload advertisements to memory 15. Application functions are configured to operate on server 12 to accomplish the setup, build and upload processes.

Subscriber 1 must sign up and enroll on the intermediary. To sign up, subscribers are required to complete a set-up process, including submission of a demographic and interest criteria to the intermediary.

The intermediary compares the demographic and interest criteria of the advertiser to the demographic and interest criteria of the subscriber to determine whether or not the subscriber is qualified. Based on the interest criteria, a set of endorsement opportunities from various advertisers is communicated to a subscriber by the intermediary.

Subscriber 1 elects to endorse an advertisement, advertiser or advertising campaign. Endorsement manager software 14 is loaded on source communication device 2. The endorsement manager software, in concert with functions resident on server 12 facilitate completion of the setup process, endorsement process and transmission of advertisements and testimonials to the destination communication device.

When a communication is transmitted between source communication device 2 and destination communication device 7, an endorsement tag is transmitted to destination communication device 7. The endorsement tag includes a URL link with an embedded code that identifies the source communication device, the advertisement or advertising campaign and an impression identification. When the endorsement tag is activated by the destination communication device, the endorsement tag is decoded by the intermediary and used to locate the requested advertisement. The associated advertisement is downloaded to the destination communication device from the intermediary. The advertisement associated with the endorsement tag may be said to be "endorsed" by subscriber 1.

In order to transmit an electronic "offer", data regarding the attributes of the electronic offer is first stored in memory 15 by server 12. A verification link to the offer is transmitted from the source communication device to the destination communication device through the network. Upon activation of the link by the destination communication device, an offer graphic is sent from the intermediary to the destination communication device. Validation of the offer by the intermediary then occurs. In another embodiment, validation occurs by the intermediary confirming location of the geographic location of the destination communication device through GPS coordinates. Upon verification, the intermediary transmits a validation or rejection graphic to the destination communication device which is then displayed. The validation graphic may include a bar code.

Point of sale 16 completes a sales transaction with recipient 8 in which electronic offer information is scanned from the display of the destination communication device by the point of sale using local communications device 18.

Figure 2:
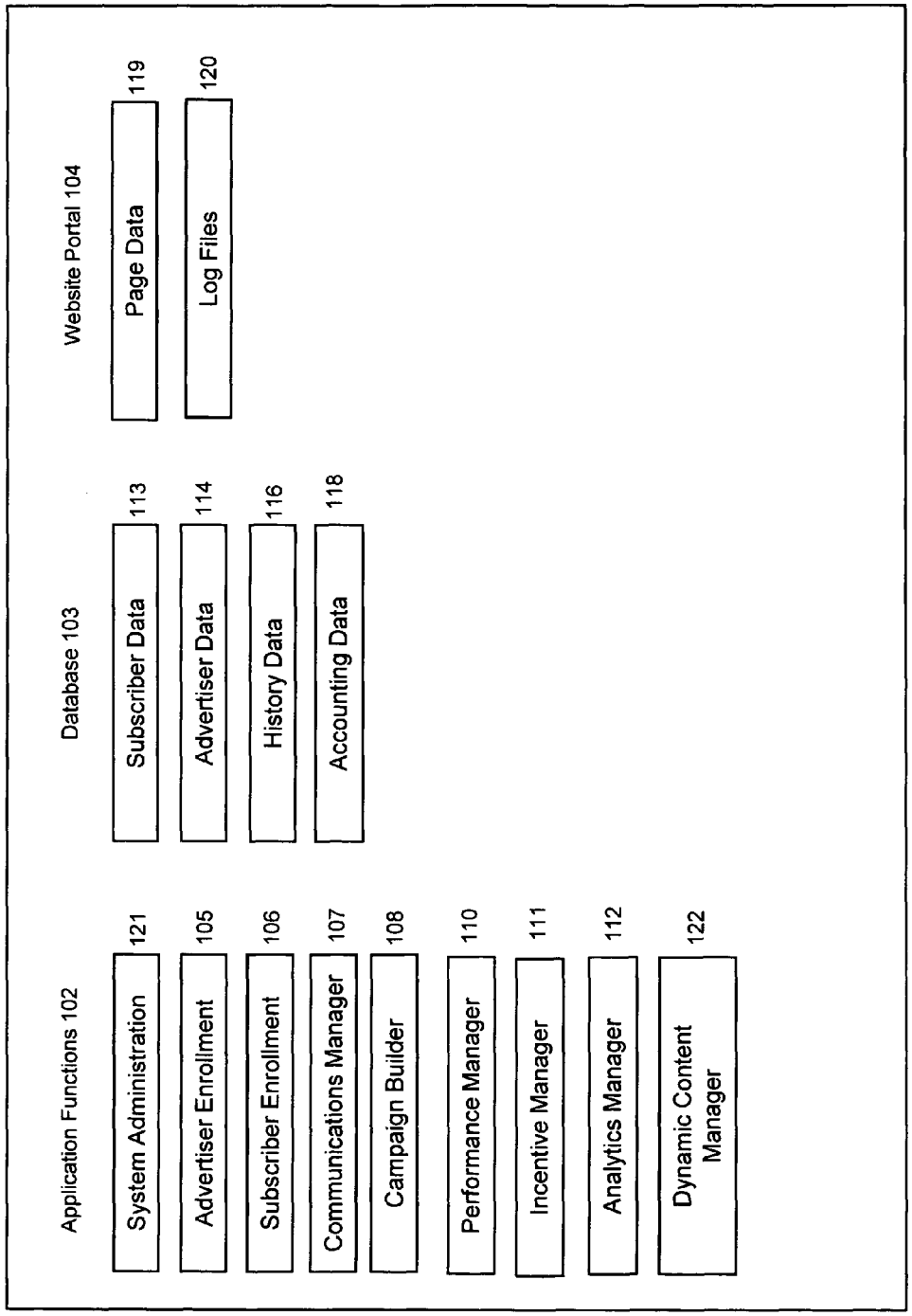
FIG. 2 is a block diagram of exemplary components of the intermediary.

Referring then to FIG. 2, intermediary 9 includes application functions 102, database 103 and website portal 104.

Application functions 102 include numerous constituent programs and objects which cooperate to carry out the functions of intermediary 9. In the preferred embodiment, the application functions comprise software written in object oriented languages. These include system administration 121, advertiser enrollment 105, subscriber enrollment 106, communications manager 107, campaign builder 108, testimonial manager 109, performance manager 110, incentive manager 111, analytics manager 112 and dynamic content manager 122.

System administration 121 provides for administration and maintenance of the various objects, including database management and management of website portal 104. Creation, deletion and editing of files and profiles is provided. Functions for screening of testimonials and demographic criteria are also provided.

Advertiser enrollment 105 coordinates and records the interaction between advertiser 10 and intermediary 9, as will be further described.

Subscriber enrollment 106 controls and records the interaction between the subscribers and the intermediary, as will be further described.

Communications manager 107 coordinates the functions between the endorsement manager software resident on the source communication device and the intermediary.

Campaign builder 108 is responsible for creating, coordinating and organizing campaigns and associated advertisements which are transmitted to the destination communication device. In the preferred embodiment, campaign builder 108 includes a set of design criteria including dimensions, preferred fonts, colors, and other graphics tools which are supplied to the advertiser via website portal. In an alternate embodiment, campaign builder 108 provides predetermined advertisement formats suitable for inclusion of custom text paragraphs to speed advertisement development. Once an advertisement is built, it is uploaded for storage in database 103. Campaign builder 108 also provides for grouping of advertisements into "campaigns." Each campaign may include attributes of timelines for deployment of each advertisement, geographic limitations, incentive programs and interest criteria for qualified subscribers. Each campaign is administered by the dynamic content manager.

Performance manager 110 provides the function of receiving and storing history log files from source communication devices by way of communication manager 107.

Incentive manager 111 coordinates the functions of tracking subscriber incentives and incentive payouts. In a preferred embodiment, the incentive manager also provides the functions of communication with financial institutions to receive payments from advertisers. Incentive manager 111, in a preferred embodiment, is also responsible for the functions of processing distributions to subscribers as incentives, and for tracking all accounting functions of the system. The incentive program may pay cash incentives, incentivize communication fees, offer product discounts, generate "rewards points" or provide product or service credit. The preferred embodiment of an incentive program utilizes a programmable electronic debit card to which credits are periodically uploaded. Incentive program selections may be made according to predefined incentive program types displayed and captured by a web form. The incentive program further requires specifying the incentive pay out. For cash and cash-like incentives (e.g. discounts or coupons) the preferred incentive program specifies an incentive amount for each recorded impression, an incentive amount for each recorded click-through, and an incentive amount for each additional action taken. Additional actions include an action that is taken in response to an advertisement or offer, for example, redeeming any offer and watching a video clip.

Analytics manager 112 is responsible for providing the functions of report generation utilized to analyze and report data related to subscribers, recipients, advertising campaigns, advertisements, endorsements and testimonials. Analytics manager 112, in a preferred embodiment, also provides the functions of statistical analysis and prediction generation based on historical data to determine the effectiveness of an advertisement or advertising campaign. In a preferred embodiment, analytics manager 112 is also responsible for statistical analysis of the demographics of purchasing patterns related to demographics, geographic location, and time of day or date during the year.

Dynamic content manager 122 is responsible for providing functions related to the business logic used to deliver relevant and advertising content based on geographic location, date, day of week, time of day, interest criteria, weather conditions, or offer variations.

Database 103, in a preferred embodiment, is preferably comprised of a relational database written in a structured query language. The database provides structured data for queries, information retrieval and report generation, as well as maintenance.

Database 103, in the preferred embodiment, includes subscriber data 113, advertiser data 114, history data 116 and accounting data 118.

Subscriber data 113 includes demographic information, psychographic data, interest criteria, identification information and login information for each subscriber. Subscriber data 113 also includes current and historical matches, and incentives earned for each subscriber.

Advertiser data 114 includes advertiser identification and log-on information. Advertiser data 114 also includes chosen interest criteria for subscribers supplied by each advertiser. Advertiser data 114 includes advertising campaign data. Advertiser data 114 further includes distribution preferences for timing and geographic location of each advertisement in the advertising campaign. Advertiser data 114 further includes a maximum financial budget for each campaign. Advertiser data 114 further includes matching data for subscribers and cost per event specifications. Advertiser data 114 also includes a collection of electronic offers with metadata associated to each electronic offer, further comprising at least one of the advertiser identity, time limitations, and geographic use and product limitations. Examples of time limitations may be a start time and an expiration time for an electronic offer. Examples of usage limitations may be a particular geographic area or a particular retail store.

History data 116 includes a compilation of data for each advertisement and advertising campaign, including the number of advertisements sent, the subscriber who sent them, the recipient of the advertisement, the number, geographic location and identification of all click-through events.

Accounting data 118 includes account information for advertisers, historical information reflecting incentives paid to subscribers, and tracking information for singular and multi-tiered distribution of funds.

Website portal 104 includes the functions related to operation of page data 119 and log files 120.

Page data 119 includes pages stored in memory capable of various communication functions required by the system. Page data 119 includes pages for subscriber addition, deletion and profile creation and maintenance. Similarly, page data 119 includes pages for the creation and maintenance of demographic and interest criteria, advertisements, advertisement campaigns and incentives through campaign builder 108, incentive manager 111 and analytics manager 112. Log files 120 include metrics of page usage and maintenance. For maintenance of the intermediary website in coordination with system administration 121.

Referring now to FIGS. 2 and 3, the advertiser enrollment process will be described. At step 22, advertiser 10 connects to intermediary 9 via the website portal. Login information is supplied and a request is made to access application functions 102 through a secure communications session. At step 24, the intermediary authenticates the advertiser login information. At step 25, application functions of advertiser enrollment 105 are activated and coordinate functions of the advertiser enrollment process. At step 26, pricing information is communicated. At step 27, pricing is accepted or declined and an advertising budget is set. If accepted the process moves to step 28. If not, the process concludes.

The advertisements and offers for the advertising campaign must be "built" and the attributes of the advertising campaign defined. The advertisements may include offers and vice versa. At step 28, a request is made for access to the campaign builder function 108 of application functions 102. At step 29, the intermediary enables a campaign builder application. At step 30, the intermediary grants access to the campaign builder function to advertiser 10. At step 31, forms related to creation of an advertising campaign the specific type of advertisement are completed by advertiser 10.

At step 32, interest and demographic criteria for qualification of subscribers is submitted.

In step 33, advertising campaign attributes are defined and include the scheduling timeline for distribution of the advertisements in the advertising campaign.

In step 34, electronic offer attributes are defined and include a redemption value, or range of redemption values, a product definition, a date and time and a maximum redemption count. The date and time may include a range of dates and times during which redemption can occur or change value. Offer attributes may include a geographic location for redemption, a bar code for identification, and other graphics. The electronic offer attributes may also include a weather specification. Other attributes include economic data, such as stock prices and averages, blog data, such as FaceBook posts and Twitter "tweets" and news events. Other attributes are possible and will be readily recognized by those of skill in the art. The redemption value and offer validity may be conditional on any one of the electronic offer attributes. For example, day of week and time of day may determine offer validity.

At step 35, keywords are defined by the advertiser for use in determining a match condition with a qualified subscriber.

At step 36, an option "auto matching" is provided. "Auto matching" is provided in three forms. First, "auto matching" may be enabled for all advertising campaigns of an advertiser. If so, each subscriber who becomes "qualified" is enabled to "endorse" every advertisement and every advertising campaign for the advertiser specified. Second, "auto matching" may be enabled for an advertising campaign. If so, each qualified subscriber is enabled to "endorse" each advertisement in the specified advertising campaign. Third, "auto matching" may be enabled for a specific advertisement. If so, each qualified subscriber is automatically qualified to endorse a specific advertisement for a specific advertising campaign.

Also at step 46, graphics files are generated including custom graphics required for the advertisement by advertiser 10 to complete each advertisement and offer.

At step 47, the completed form and graphics files and the interest criteria, auto matching choice, advertising campaign attributes (including offer data) and incentive programs are uploaded to the intermediary. At step 48, intermediary 9 stores the uploaded data and assembles and stores the advertisement associated with advertiser 10 in the database in advertiser data 114. At step 49, the advertisement or offer is assigned a unique identification numbers by the intermediary and stored in the database under advertising data 114.

At step 52, the advertiser funds the advertising campaign and executes the advertisement agreement. At step 53, the advertiser transmits funding to the intermediary and requests execution of the advertising campaign. Funding preferably includes transmission of a cash amount to the intermediary via wire transfer. At step 54, the intermediary records receipt of the funding and creates a record in the database in accounting data 118 by incentive manager 111. At step 55, the intermediary activates each advertising campaign.

Referring to FIGS. 2 and 4, the subscriber sign-up process will be described. In step 56, source communication device 2 connects to intermediary 9 through website portal 104. In step 57, a request for information is sent via a form to the source communication device from the intermediary. The form requests basic information such as communication device user's name, communication device type, and a communication device identification number such as a phone number or IP address. At step 58, the source communication device responds by transmitting the completed form including a requested username and password. At step 59, the intermediary authenticates the source communication device and starts subscriber enrollment 106. Authentication may include cross-checking the phone number or the device identification and the profile information of the user with publicly available data sources. At step 60, the intermediary sends a text message to the source communication device confirming setup. At step 61, the source communication establishes a secure communication session with the intermediary via web services on some other secure communications channel.

In step 67, a determination is made by the intermediary as to whether the source communication device has the technical capability to participate. At step 68, the intermediary then checks the source communication device for an endorsement manager program by attempting to communicate with it. At step 69, if the endorsement manager is present, a return acknowledgment message is generated. At step 70, the acknowledgment message is sent to the intermediary. At step 71, if the endorsement manager program is not present, then it is retrieved by the source communication device. At step 72, the endorsement manager program is installed and is activated and an acknowledgment message is generated. At step 73, the acknowledgment is returned to the intermediary. At step 74, application functions of the communications manager are activated.

In step 75, a subscriber profile form is completed. The subscriber profile includes subscriber demographic information. Subscriber demographic information includes gender, age, zip code, and may include other information such as ethnicity, income level, property ownership and education. At step 76, the subscriber profile is sent to the intermediary. At step 77, the Intermediary receives and stores the profile data in subscriber data 113 in the database. At step 78, keywords are defined by the subscriber to become part of the subscriber profile to be used in determining a match condition. In step 79, an interest profile is completed. The interest profile includes a list of hobbies, interests, affiliations and other psychographic information. At step 80, the interest profile is sent to the intermediary. At step 81, the intermediary receives and stores the interest data in subscriber data 113 in the database. At step 82, the endorsement manager program enables a local endorsement dashboard. At step 83, the endorsement manager program requests transmission of endorsement opportunities. At step 84, the intermediary retrieves the requested endorsement opportunities. At step 85, the endorsement opportunities are sent from the intermediary to the source communication device. At step 86, the endorsement opportunities are displayed.

FIG. 5A shows a preferred manual subscriber enrollment process. Referring then to FIGS. 2 and 5A, at step 157, the source communication device connects to the intermediary web portal and transmits login data. At step 158, the login data is authenticated and functions of subscriber enrollment 106 are started. At step 159, an acknowledgment is transmitted. In step 160, the source communication device sends a request to endorse. At step 161, the intermediary responds to the request by performing a matching process to qualify subscribers for endorsement opportunities.

The matching process correlates the demographic and interest profile data from the subscriber with the demographic criteria and interest criteria of the advertiser. In the preferred embodiment, each element of the demographic criteria, interest profile, keywords, or other criteria of the advertiser is compared to each element of the demographic profile to arrive at a match condition. [each corresponding] Similarly, each element of the interest criteria of the subscriber is compared to each element of the advertiser to arrive at a match condition.

At step 162, the intermediary returns a list of endorsement opportunities for which the subscriber is "qualified." Each endorsement opportunity includes a description of the advertiser, advertising campaign, advertisement.

In an alternate embodiment, step 162 includes the steps of the intermediary providing a list of non-participating advertisers to the subscriber or the ability to suggest an unlisted advertiser.

The endorsement opportunities are displayed at step 163. In step 164, the subscriber selects a subset of the endorsement opportunities for enrollment. The subset selection is transmitted to the intermediary at step 165. At step 166, intermediary stores the selected subset in the database in subscriber data 113. At step 167, the intermediary creates a set of endorsement identifiers for each of the endorsement opportunities of the selected subset. The endorsement identifiers include embedded URLs and endorsement identifiers to serialize each specific endorsement tag with a unique code.

Referring to FIG. 8, endorsement identifier 920 is created by calculating a hash code between source communication device identification 900 and an advertising campaign identification 905. An example is shown below:

http://bca2.com/ad.aspx?d=12V7NS8MPTXGTFL

The source communication device identification is preferably the device serial number or the phone number.

Returning to FIG. 5A, at step 168, the endorsement identifier is sent to the source communication device. At step 169, the endorsement identifier is stored on source communication device by the endorsement manager program. In step 170, the endorsement manager program periodically triggers a refresh for endorsement identifiers from the intermediary. At step 171, updated endorsement identifiers are requested. At step 172, the intermediary automatically updates the endorsement identifiers which reference current versions of advertisement campaign identifications, advertisement identifications or electronic coupon identifications. At step 173, updated endorsement identifiers are transmitted. At step 174, the updated endorsement identifiers are stored on the source communication device by the endorsement manager program.

Once endorsement identifiers are stored on the source communication device, the "subscriber" becomes an "endorser" capable of participating in distribution of advertisements and incentive programs. A "bi-directional selection" has occurred between the subscriber and the advertiser where each has "chosen" the other and has agreed to participate in distribution of advertisements. A "bi-directional selection" also occurs if a subscriber chooses all available advertisers and/or an advertiser chooses all available subscribers.

FIG. 5B is a flowchart of an alternate embodiment showing an automatic subscriber enrollment process. Referring then to FIGS. 2 and 5B, in step 212, the source communication device initiates a communication to the destination communication device. In step 213, the endorsement tag is sent from the source communication device to the destination communication device in connection with the communication. In step 214, the destination communication device opens the endorsement tag. The endorsement tag is clicked, thereby activating the link incorporated in the endorsement tag. In step 215, a request for an advertisement to the intermediary is sent.

In step 217, the intermediary, via the dynamic content manager generates and returns the advertisement. Included in the advertisement is a sign-up link for "automatic" sign-up. In step 218, the advertisement is sent to the destination communication device. The advertisement is displayed at step 219. The destination communication device activates the automatic sign-up link in step 220. A sign-up request is sent to the intermediary at step 221. At step 223, the Intermediary starts the functions of subscriber enrollment 106. At step 224, intermediary 9 acknowledges the sign-up request by sending an acknowledgement message. The acknowledgement message contains a link to download the endorsement manager. At step 225, the destination communication device requests a secure communication session using the web portal. A secure communication session is established at step 226.

In step 227, authentication occurs and the destination communication device is automatically enrolled in the advertising campaign associated with the advertisement that was displayed. At step 228, a unique endorsement identifier is generated for the destination communication device as a new qualified subscriber. In step 232, the endorsement manager program along with the endorsement identifier is sent to the destination communication device. At step 234, the endorsement manager program is installed and activated. At step 235, the endorsement identifier is stored by the endorsement manager program.

FIG. 5C shows an alternate embodiment of an automatic multi-tier subscriber enrollment process. As destination communication devices 610, 611 and 612 are automatically enrolled, they automatically inherit the status of qualified subscriber attributed to the source communication device for advertising campaign 605 associated with the advertisement viewed. Destination communication devices 610, 611 and 612 comprise first tier 601 of destination communication devices. Similarly, when destination communication devices 620, 621 and 622 are automatically enrolled, they also automatically inherit the status as a qualified subscriber for advertising campaign 605 creating second tier 602 of destination communication devices. Additional tiers of destination devices are created as they receive communications from first tier 601 of destination communication devices and second tier 602 of destination communication devices. Each additional tier of destination communication devices inherits the status as a qualified subscriber for advertising campaign 605 and original incentive program 606. The intermediary generates endorsement identifiers for each new destination communication device in each new tier of destination communication devices. The endorsement identifiers each contain the source communication device identification. The source communication device identification is used to track incentives paid to the source communication device from endorsement transactions performed by the first tier, second tier and additional tiers of destination communication devices.

FIG. 6 shows a flowchart of the advertisement distribution process of the system. Referring then to FIGS. 2 and 6, at step 259, the endorsement manager program generates a unique identifier.

Referring to FIG. 8, impression identification 910 is hashed with endorsement identifier 920 to create unique identifier 940. In the preferred embodiment, the endorsement manager program generates a number based on elapsed time from a predefined event in the past, such as the date that endorsement manager software was installed, on the subscriber communication device. An example is shown below:
http://bca2.com/ad.aspx?d=12V7NS8MPTXGTFL&i=8efvy In alternate embodiments, other information may be combined to create unique identifier 940, such as date and time information, geographic location information and device settings of the source communication device.

Returning to FIG. 6, at step 260, the endorsement manager program sends the endorsement tag containing the unique identifier to the destination communication device. At step 261, the endorsement manager software records the transmission of the endorsement tag as an event in a history log. In step 262, the endorsement tag is opened on the destination communication device. At step 264, a request for an advertisement is sent to the intermediary from the destination communication device by activating the URL link embedded in the endorsement tag. At step 265, the intermediary generates and formats an advertisement.

In a preferred embodiment, the step of generating an advertisement includes the dynamic content manager 122 of intermediary 9 decoding the hashed unique identifier in the endorsement tag and decoding advertisement campaign identification 905. The dynamic content manager then retrieves the appropriate advertisement graphics called for by the advertisement identification from the database and formats it to match the device type of destination communication device.

FIG. 7 is a flowchart showing the detail of an alternate embodiment of dynamic advertisement generation. In step 366, the intermediary parses the web browser session header for the destination communication device OS, time/date stamp, IP address and browser type. In step 368, the intermediary determines if geographical location information is requested by the configuration of the advertisement. If requested, then the intermediary sends a request for GPS coordinates to the destination communication device in step 370. In step 372, authorization to release the GPS coordinates is provided by the destination communication device. At step 374, the GPS coordinates are sent to the intermediary. In step 375, the intermediary locates and retrieves an advertisement related to the GPS coordinates using the dynamic content manager.

In an alternate embodiment, the intermediary determines the geographical location of the destination communication device by determining which cellular tower is carrying the signal from the destination communication device.

In step 377, the dynamic content manager of the intermediary determines if the advertisement requires supporting data from outside data sources is required by the advertisement. If so, at step 378, the intermediary requests the supporting data from outside data source 355. Examples of supporting data include weather data, news data (such as a news event), economic data (such as reports of the Dow Jones Industrial Average) and blog data (sources such as FaceBook and Twitter). At step 380, outside data source 355 configures the supporting data according to parameters included in the request. At step 382, the intermediary retrieves the supporting data from the outside data source.

At step 384, the intermediary configures the advertisement according to data from the parsed header, geographical location and outside data source.

In an alternate embodiment, generation of the advertisement is altered according to a random selection process. The intermediary randomly chooses an advertisement from a predetermined set of advertisements stored in the database of advertiser data 114.

In an alternate embodiment, the intermediary selects which advertisement to send based on the date, time, season of the year, holiday dates, dates of special events or weather related data from outside data source 355. Weather data may be used in association with geographic location data to determine the weather at the geographic location of the destination communication device.

In yet another embodiment, the intermediary selects the advertisement based on previous responses by the destination communication device. Previous responses are drawn from history data 116.

Returning to FIG. 6, at step 266, the advertisement is transmitted to the destination communication device. At step 267, the destination communication device opens and views the advertisement. At step 268, the intermediary records the endorsement click-through event in the history data in association with the subscriber identified in the unique identifier contained in the endorsement tag and when available the GPS coordinates of the destination communication device.

At step 269, the destination communication device activates an embedded link in the advertisement. At step 270, a message is sent to the Intermediary requesting information. At step 271, the intermediary records the request for information and logs the event against the source communication device identifier in a history file. At step 272, the information is provided to the destination communication device. At step 273, the information is viewed.

At step 283, the endorsement manager program periodically triggers an upload of the history log file to the intermediary to be tracked for incentive distribution. In step 284, the history log is uploaded. At step 285, the history log is stored according to the source communication device identification. In step 286, intermediary 9 compiles and tracks incentives.

FIG. 9 shows incentive administration process. Referring then to FIGS. 2 and 10, in step 767, the intermediary monitors active incentive programs through the functions of incentive manager 111, and if it detects a change in an attribute of an incentive program is scheduled to occur, then at step 768, a message may be sent to the source communication device regarding the change. Examples of changes in attributes include closure of an incentive program or an advertising campaign or temporary special events like a coupon offer.

At step 770, performance data derived from the history log file is analyzed to arrive at an accounting of incentives and fees. At step 775, a report summarizing the incentives and fees due is made available to the advertiser through the website site portal 104. At step 776, the fees due are accessed via the web portal. At step 777, a report is made available to the source communication device regarding incentives through website portal 104. At step 778, the report is accessed via the web portal. At step 785, the intermediary authorizes payment of incentives. In a step 790, payment is made. In the preferred embodiment an electronic cash card is created and sent to the subscriber by mail. In step 795, the financial accounts of the advertisers are appropriately debited by the incentive manager of the intermediary and stored in accounting data 118.

Referring to FIGS. 1, 2 and 10, a description of a preferred method of electronic offer creation, transmission and redemption will be provided.

At step 504, the endorsement tag is opened on the destination communication device. At step 505, a request for an advertisement is sent from the destination communication device to the intermediary by activating the URL link embedded in the endorsement tag. At step 506, the intermediary generates and formats the advertisement. During generation, the intermediary retrieves the offer attributes from advertiser data 114. Various features of the offer, such graphics and the offer redemption value, can be varied based on the date, time or geographic location of the destination communication device. At step 507, the intermediary requests the GPS coordinates of the destination communication device. At step 508, the destination communication device supplies its GPS coordinates.

It should be noted that other location gathering mechanisms can be used to determine the locator of the destination communication device. For example, location through cell phone tower usage.

The electronic offer is transmitted to the destination communication device in step 511. At step 512, the destination communication device displays the electronic offer.

At step 514, if the offer includes a validation "button", it is activated by clicking by the destination device. The "button" graphically disguises a link. At step 515, the destination device sends a validation request to the intermediary.

In step 516, offer manager 123 of the intermediary determines validity of the electronic offer by retrieving stored attributes of the offer from advertising data 114. The intermediary retrieves the activation code, date, time and geographic use limitations. The intermediary also retrieves the advertiser identity, the product and the redemption value. Once retrieved, the offer attributes are compared to activation code, the date, time and known geographic location of the destination communication device. Advertiser identity and product identity are also compared. If the attributes are valid, offer processing continues. If invalid, offer processing stops.

After validation, a validation graphic message is generated by the intermediary at step 517. The validation graphic may either indicate a valid offer message or an invalid offer message. If a valid offer is indicated, at step 518, the intermediary may optionally generate a barcode. The intermediary maintains a running count of the number of redemption events that have occurred. At step 519, if a valid offer is indicated, the total redemption count is debited. If the maximum redemption count has been reached, then the offer is not valid. In step 520, the intermediary sends the validation graphic message, including the bar code if generated, to the destination communication device. At step 521, the validation graphic is displayed on the destination communication device.

At step 523, the barcode is scanned. The point of sale captures the barcode information from the destination communications device at step 524.

At step 525, the point of sale redeems the electronic offer and as it would a paper coupon.

In an alternate embodiment, the redemption event can assume different forms. For example, a link may be provided to purchase tickets at an event. Another link may be provided to activate and display a streaming video. A third type of link may be provided to schedule an appointment such as, a doctors appointment or a test drive for an automobile. Each separate link when activated communicates a message to the intermediary who then takes the appropriate action, transmits the appropriate data, or links to another site as required.

In another alternate embodiment, the redemption event is based on one or more of the electronic offer attributes. For example, the redemption event can be based on the geographic location of the destination device, a time, a date, or a number of redemption events.

At step 538, the intermediary stores historical data for verified offers.

At step 548, the analytics function performs a historical sales trend analysis, whereby sales associated to offer redemptions are analyzed by category.

At step 550, the analytics function further performs a set of predictions of sales trends related to products, advertisers, offers, or subscribers.

At step 551, the intermediary generates graphics associated with historical sales trends and sales predictions. At step 552, the intermediary makes the graphics generated available through the web portal.

Figure 11:
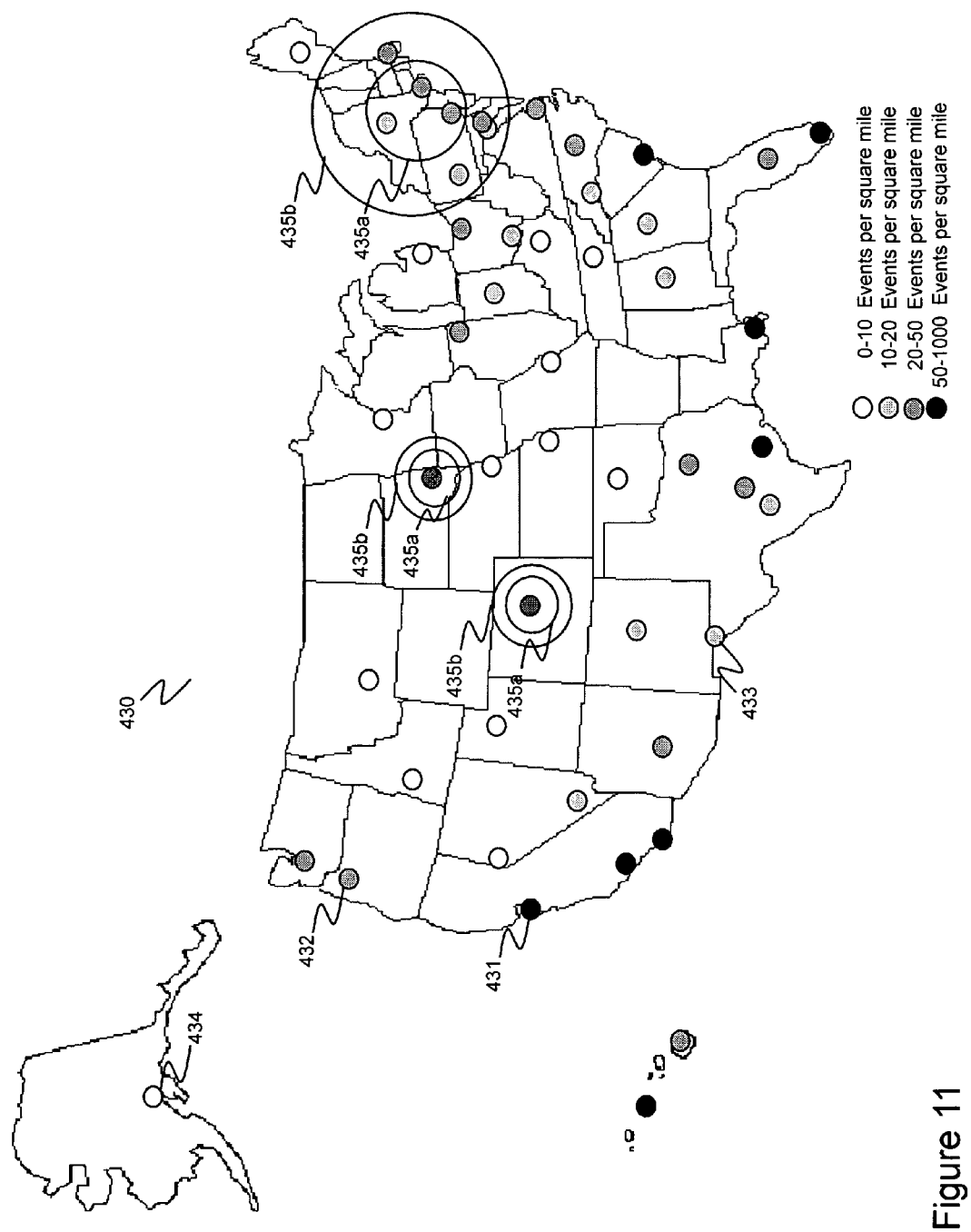
FIG. 11 is a graphical illustration of a map of activation and redemption of electronic offers.

FIG. 11 is an example of a geographical map generated by the analytics manager. Geomap 430 is a map including an offer redemption density display. The display indicates offer use by summing the number of validation events for a offer type for a defined geographic region for a discrete period of time. Validation events may be indicated for each offer, each advertiser, each advertising campaign, each advertisement, and each subscriber. Shapes 431, 432, and 433, are generated by calculating the density of validation events per area and displaying like colors in areas of equal density.

Animation of the geomap is enabled by the analytics manager by storing several (or many) geomaps in memory according to consecutive periods of time and then displaying them in order in rapid succession. Changes in the calculated densities of redemption events then can be visualized as changing colored areas on the geomap. As examples, areas 435a may be displayed at time=1. Areas 435b may be displayed at time=2. The increase in each area from 435a to 435b indicates an expansion of area where a similar density of events occurs. Thus, the advertiser may adjust distribution of electronic offers to various geographic areas guided by the geomap.

Although various embodiments have been described in detail, those skilled in the art will understand that changes, substitutions and alterations can be made without departing from the spirit and scope of what has been described. Accordingly, all such changes, substitutions and alterations are intended to be included as defined in the following claims.

The invention claimed is:

1. In a system comprising a network, a source communication device, a first destination communication device and an intermediary connected to the network, a method for providing an electronic offer to a first recipient associated with the first destination communication device and for incentivizing a subscriber associated with the source communication device comprising:
   receiving, at the intermediary, a first profile including a set of identification requirements related to at least one advertiser of a group of advertisers;
   receiving, at the intermediary, a second profile including a set of identification data related to the subscriber;
   deriving, by the intermediary, a match condition between the first profile and the second profile;
   determining, by the intermediary, if the subscriber is a first qualified subscriber based on the match condition;
   transmitting, from the intermediary to the source communication device, a first endorsement tag related to the at least one advertiser of the group of advertisers and linked with advertising content;
   transmitting a first content communication between the first source communication device and the first destination communication device;
   transmitting the first endorsement tag to the first destination communication device; and,
   receiving a first signal, at the intermediary from the first destination communication device, through execution of the first endorsement tag, to transmit the electronic offer.

2. The method of claim 1 further comprising the steps of:
   transmitting an incentive program from the intermediary to the source communication device for participation of the first qualified subscriber; and,
   incentivizing the first qualified subscriber at the source communication device according to the incentive program.

3. The method of claim 2 further comprising the step of:
   verifying, by the intermediary, a validity state of the electronic offer.

4. The method of claim 3 wherein the step of verifying, by the intermediary, a validity state of the electronic offer comprises the further steps of:
   receiving, at the intermediary, a set of offer attributes;
   receiving, at the intermediary, a verification request from the first destination communication device;
   comparing, by the intermediary, at least one offer attribute of the set of offer attributes to the verification request to arrive at a set of results;
   generating, by the intermediary, a verification signal based on the set of results; and,
   transmitting the verification signal from the intermediary to the first destination communication device.

5. The method of claim 4 wherein the step of comparing further comprises the steps of:
   receiving, at the intermediary, a predetermined set of valid geographic coordinates in the set of offer attributes;
   receiving, at the intermediary, a set of location geographic coordinates as the verification request; and,
   comparing, by the intermediary, the set of location geographic coordinates to the set of valid geographic coordinates.

6. The method of claim 4 wherein the step of comparing further comprises the steps of:
   receiving, at the intermediary, a predetermined set of time restrictions in the set of offer attributes;
   receiving, at the intermediary, a set of time stamp data, related to execution of the electronic offer, as the verification request; and,
   comparing, by the intermediary, the set of time stamp data to the set of time restrictions.

7. The method of claim 6 further comprising the steps of generating, by the intermediary, a bar code and
   including the bar code in a static graphic image.

8. The method of claim 4 wherein the verification signal is drawn from one of the group of a valid verification signal and an invalid verification signal, wherein the set of offer attributes includes a maximum number of valid verification signals; the method further comprising the steps of:
   tracking, by the intermediary, a number of valid verification signals;
   comparing, by the intermediary, the number of valid verification signals to the maximum number of valid verification signals; and,
   generating, by the intermediary, an invalid verification signal if the number of valid verification signals is greater than the maximum number of valid verification signals.

9. The method of claim 4 wherein the step of generating includes the further step of:

generating, by the intermediary, a verification signal, including a set of redirection links drawing from one or more of the group of, a redirection link to a streaming video site, a redirection link to a ticket purchase site and a redirection link to an appointment calendar site.

10. The method of claim 3 further comprising the steps of:

receiving a set of feedback data, at the intermediary from the first destination communication device, related to a redemption event;

tabulating, by the intermediary, one or more of the set of feedback data; and, generating, by the intermediary, a report based on the tabulation.

11. The method of claim 10 further comprising the step of:

generating, by the intermediary, a trend analysis based on the tabulation.

12. The method of claim 10 including the further step of:

generating, by the intermediary, a geographic map of validation density based on the tabulation.

13. The method of claim 12 including the further step of:

animating, by the intermediary, the geographic map of validation density to show a density change.

* * * * *

UNITED STATES PATENT AND TRADEMARK OFFICE
CERTIFICATE OF CORRECTION

PATENT NO.        : 8,452,646 B2                           Page 1 of 1
APPLICATION NO.   : 12/925218
DATED             : May 28, 2013
INVENTOR(S)       : Andrew E. Levi et al.

It is certified that error appears in the above-identified patent and that said Letters Patent is hereby corrected as shown below:

On the Title Page insert Item (63)

-- Related U.S. Application Data

(63) Continuation-in-Part of application No. 12/803,635, filed on July 1, 2010, now Pat. No. 8,438,055 which is a continuation-in-part of application No. 12/592,019, filed on Nov. 18, 2009, now Pat. No. 8,155,679, which is a continuation-in-part of application No. 11/318,144, filed on Dec. 23, 2005, now Pat. No. 7,664,516. --

Signed and Sealed this
Twenty-second Day of April, 2014

Michelle K. Lee
*Deputy Director of the United States Patent and Trademark Office*